United States Patent [19]

Nakao et al.

[11] 3,895,427

[45] July 22, 1975

[54] MACHINE TOOL WITH OVERHEAD TOOL MODULE STORAGE MAGAZINE

[75] Inventors: Hisaji Nakao; Akira Kurosaka, both of Toyota; Katsunori Otani, Kariya; Sadaaki Tsuzuki, Kariya; Yuzo Honda, Kariya, all of Japan

[73] Assignee: Toyoda-Koki Kabushiki Kaisha, Japan

[22] Filed: Mar. 29, 1974

[21] Appl. No.: 456,370

[30] Foreign Application Priority Data
Apr. 5, 1973   Japan.............................. 48-38931

[52] U.S. Cl. ............................................... 29/568
[51] Int. Cl. ............................................ B23q 3/157
[58] Field of Search ...................................... 29/568

[56] References Cited
UNITED STATES PATENTS
3,650,018   3/1972   Perry et al. ............................ 29/568
3,789,473   2/1974   Pagella et al. ......................... 29/568

*Primary Examiner*—Andrew R. Juhasz
*Assistant Examiner*—Z. R Bilinsky
*Attorney, Agent, or Firm*—Oblon, Fisher, Spivak, McClelland & Maier

[57] ABSTRACT

A machine tool is provided with an overhead storage magazine which indexably carries a plurality of tool modules on a circular guide way thereof providing a first and a second changing stations where tool modules are replaced. A clamping device is mounted on a spindle head for shifting the tool module in a direction traversing the circular guide way to thereby clamp the same on the spindle head when it has been moved from a lower machining position to an upper end of a vertical path of movement thereof defining the first changing station. A shifting device is mounted on an elevator for shifting the tool module in the traversing direction to thereby replace the same between the elevator and the guide way. Then, the elevator is vertically moved to the upper end of its movement, defining the second changing station. The clamping and the shifting devices are designed to permit tool modules to pass therethrough in the indexing operation of tool modules.

10 Claims, 10 Drawing Figures

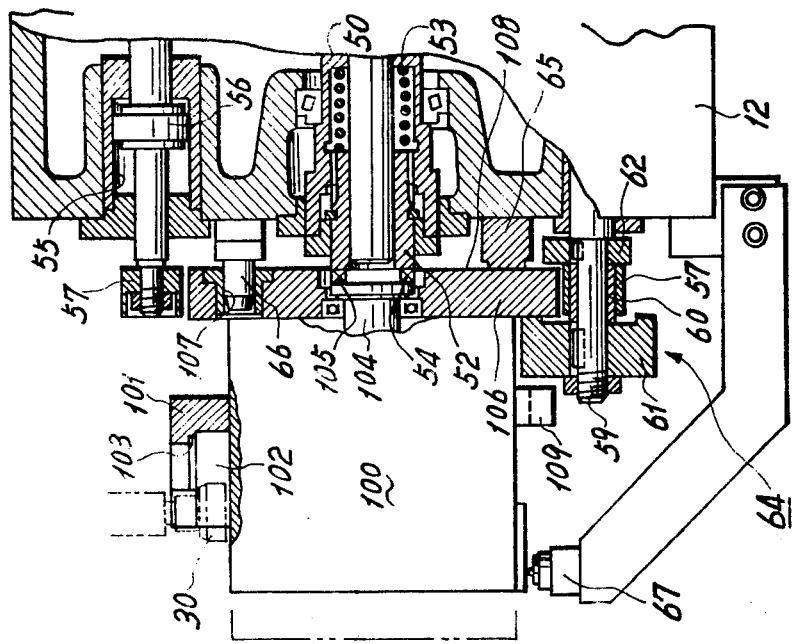

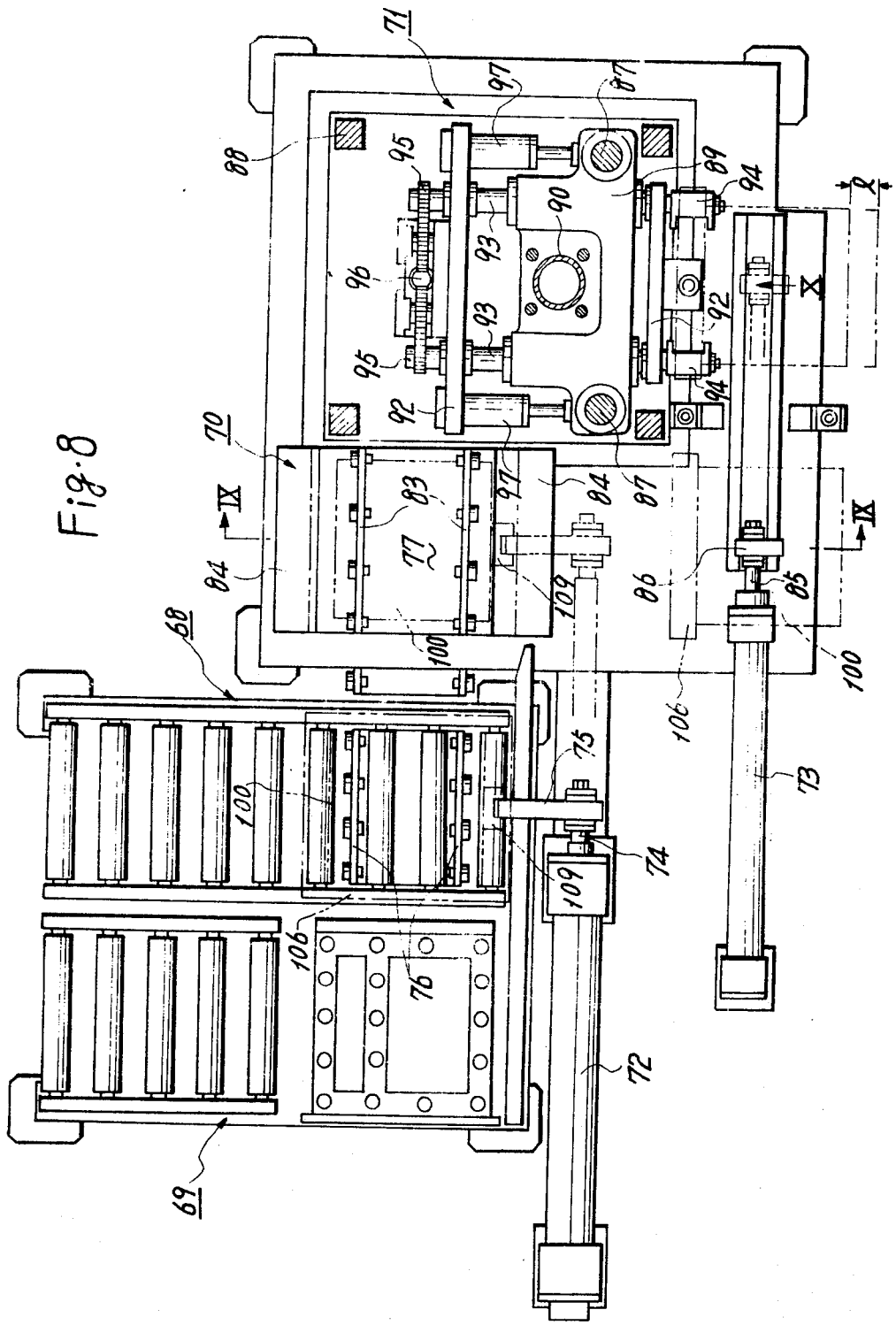

3,895,427

MACHINE TOOL WITH OVERHEAD TOOL MODULE STORAGE MAGAZINE

BACKGROUND OF THE INVENTION

The present invention relates generally to machine tools for drilling boring, reaming, milling or the like which employ a plurality of changeable tool modules, and more particularly to a machine tool provided with an arrangement of a spindle head and an overhead storage magazine for providing a simplified tool module changing mechanism and operation.

As is well known in the art, a machine tool can be provided with an automatic tool changing device for continuously performing a series of machining operations on a workpiece by automatically changing a plurality of single tools. The machine tool of this type has made a significant contribution to the reduction of man power. It is, however, difficult to reduce a machining cycle time, particularly in the case where a plurality of parallel holes are required to be machined on a workpiece, because the tool operations are performed so many times. In such machining operations, the use of the changeable tool module capable of having a plurality of single tools is advantageous to considerably increase the machining efficiency.

A machine tool employing such changeable tool modules is provided with a storage magazine for storing a number of tool modules and a tool module changing device for automatically changing the tool module between the storage magazine and the spindle head. In this type machine tool, generally the storage magazine is of very large size is of great weight, since it must be able to store a large number of tool modules, each of which itself is large in size and quite heavy. Therefore, the storage magazine, which is desirable to be mounted near the spindle head with respect to the tool module changing operation, was obliged to be mounted in a position distant from the spindle head. In this case the machine tool was required to be provided with a large-sized tool module transferring device for transferring tool modules between the spindle head and the storage magazine. As a result, the tool module changing time was made relatively long and the foundation area occupied by the machine tool was significantly enlarged.

SUMMARY OF THE INVENTION

It is, therefore, an object of the present invention to provide a compact machine tool capable of performing a rapid tool module changing operation directly between a storage magazine and a spindle head.

It is another object of the present invention to provide a compact machine tool provided with an overhead tool module storage magazine having a circular storage or guide way, along which a desired tool module is indexable, whereby the foundation area of the machine tool is reduced from that heretofore required.

Still another object of the present invention is to provide a compact machine tool of simple construction which is capable of mounting and detaching a tool module on and from a tool module holding device carried on a storage magazine at the same time a tool module is being unclamped and clamped on and from the spindle head, respectively, whereby the tool module changing time is shortened.

A further object of the present invention is to provide a compact machine tool having an apparatus capable of easily loading and unloading a tool module to and from an overhead storage magazine.

Briefly, according to the present invention, these and other objects are achieved by providing a machine tool mainly comprising a machine column, a plurality of supporting columns, an overhead magazine body mounted on the supporting columns, a spindle head slidably mounted on the machine column, a clamping device and a shifting device, as mentioned below. The overhead magazine body has a circular guide way wherein a first changing station and a second changing station are provided. A plurality of holding devices are indexably mounted on the circular guide way for detachably holding a plurality of tool modules, respectively. The tool modules can be mounted on and detached from the holding devices both at the first changing station and the second changing station. The spindle head is vertically moved from a lower machining position to an upper end of a vertical path of movement thereof defining the first changing station. A driving motor is mounted on the overhead magazine body for moving the holding devices along the circular guide way till an indexing device indexes the holding device to the first or the second changing stations. A clamping device is mounted on the spindle head for shifting the tool module in a direction traversing the circular guide way to thereby clamp and unclamp the same on and from the spindle head. A new tool module is detached from the holding device indexed to the first station at the same time when one is being clamped to the spindle head. To the contrary, a previously used tool module is mounted on an empty holding device indexed to the first changing station at the same time one is being unclamped from the spindle head. The clamping device can permit tool modules to pass therethrough in the indexing operation. An elevator device is slidably mounted on a frame base for moving the tool module toward and away from the second changing station defined by the upper end of the path of movement thereof. A shifting device is mounted on the elevator device for shifting the tool module in the traverse direction to thereby load and unload the same on and from the holding device. The shifting device which is mounted on the elevator device can permit hanging devices to pass therethrough in the indexing operation.

BRIEF DESCRIPTION OF THE DRAWINGS

Various other objects, features and attendant advantages of the present invention will be more fully appreciated as the same becomes better understood from the following detailed description of a preferred embodiment when considered in connection with the accompanying drawings, in which like reference numerals designate like or corresponding parts throughout the several views, and wherein:

FIG. 6 is a cross-sectional view showing the unclamping state of a tool module to the spindle head, taken along the line VI—VI of FIG. 5;

FIG. 7 is a fragmentarily cross-sectional view showing the clamping state of a tool module to the spindle head in FIG. 6;

FIG. 8 is an enlarged cross-sectional view showing the tool module loading and unloading device, taken along the line VIII—VIII of FIG. 1;

DETAILED DESCRIPTION OF THE PREFERRED EMBODIMENT

Figure 1:
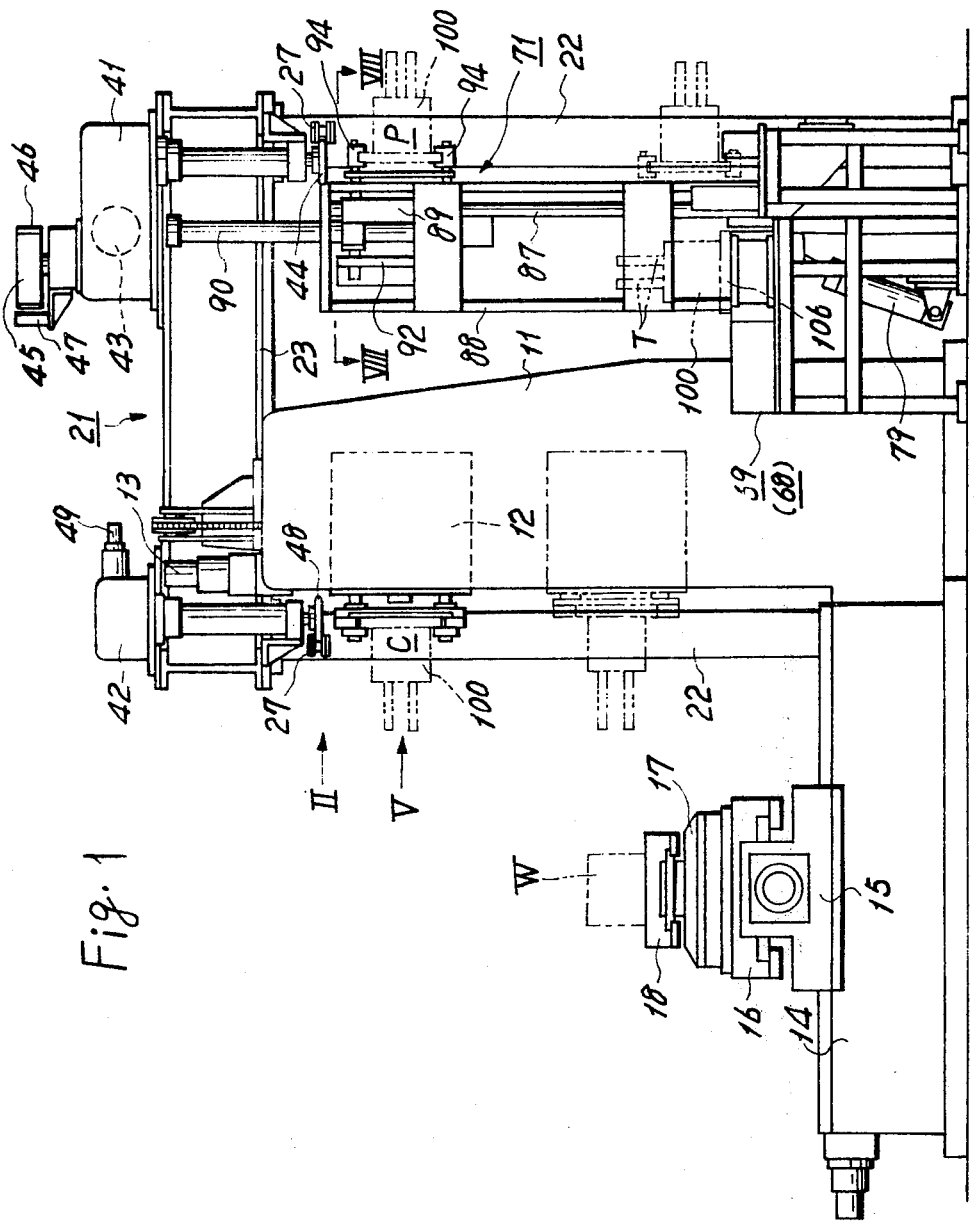
FIG. 1 is a side view, partly broken away, showing a machine tool according to the present invention.

Referring now to the drawings, and particularly to FIG. 1 thereof, a spindle head 12 is slidably mounted on a machine column 11 and is vertically moved thereon by a feed motor 13 through a feed screw device, not shown. A saddle 15 is slidably mounted on a machine bed 14 so as to be moved horizontally toward and away from the machine column 11 by a feed motor. A table 16 is slidably mounted on the saddle 15 so as to be horizontally moved by a feed motor in a direction perpendicular to the direction of movement of the saddle 15. A rotary table 17 is rotatably mounted on the table 16 for receiving and positioning thereon a work transferring pallet 18 on which a workpiece to be machined is attached.

Figure 3:
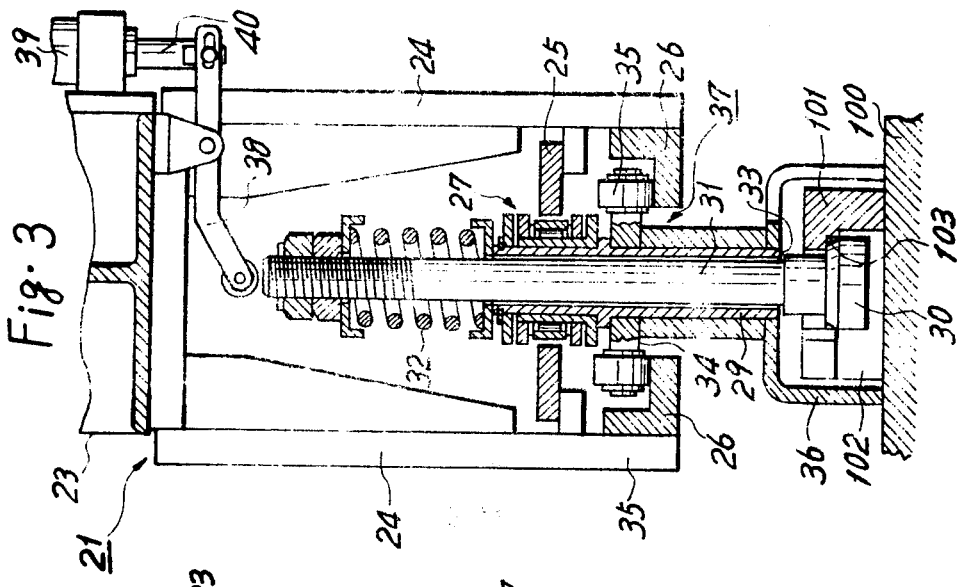
FIG. 3 is an enlarged cross-sectional view, taken along the line III—III of FIG. 2.
Figure 2:
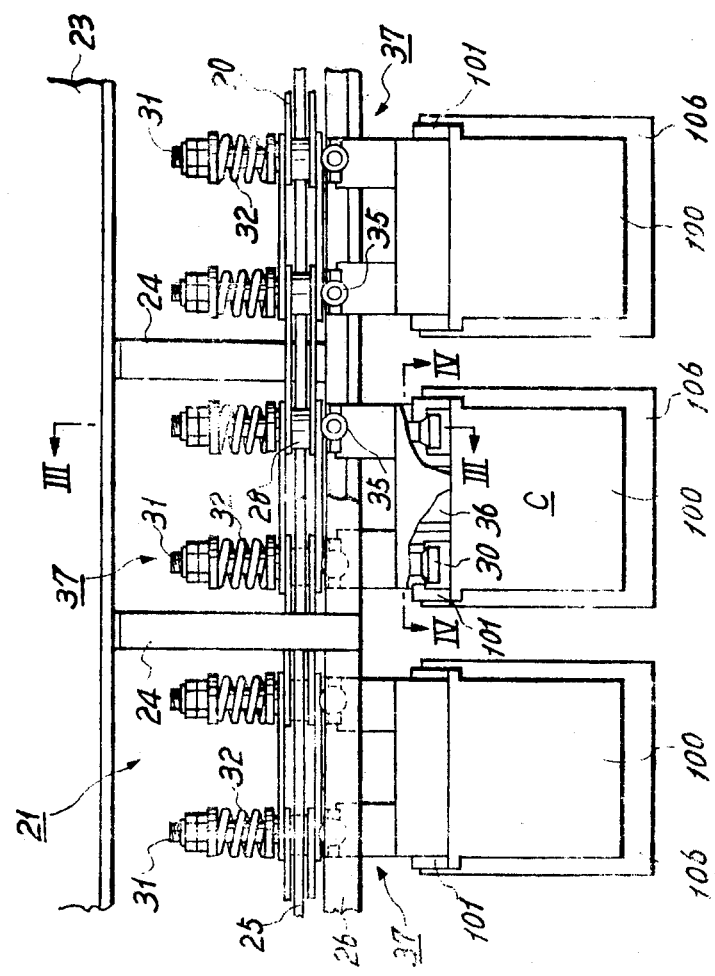
FIG. 2 is an enlarged front view fragmentarily showing the tool module storage magazine, taken along the arrow II of FIG. 1.

FIGS. 2 and 3 show the main portions of an overhead-type storage magazine 21 for storing a plurality of tool modules 100. The tool module 100 indicates a machining head which serves to mount a tool or tools, such as drills, reamers, milling cutters or the like, for performing a machining operation on a workpiece, an inspecting head for inspecting a completed workpiece, and a cleaning head for cleaning machined portions of a workpiece. The storage magazine 21 is constructed of a magazine body 23 and four supporting columns 22 which are installed on the floor to support the magazine body 23 over the machine column 11. A plurality of pairs of spaced supporting members 24 are secured to and under the magazine body 23 at regular intervals for horizontally hanging two pairs of parallel and circular guide rails 25 and supporting rails 26 around the machine column 11. The pair of guide rails 25 are provided so as to movably receive therebetween an endless chain 27, the chain rollers 28 of which are guided by the inner wall of guide rails 25.

Supporting sleeves 29 serve as connecting pins to connect chain links 20 to each other to thereby provide the endless chain 27. A vertical supporting rod 31 is loosely received throughout each supporting sleeve 29, and an enlarged engaging head portion 30 is formed on the lower end of each supporting rod 31. A spring 32 which has a spring force sufficient to bear the weight of the tool module 100 is mounted between each of the supporting sleeves 29 and the respective supporting rods 31. As a result, each supporting rod 31 is normally maintained at its upper end position and a shoulder thereof is held in abuting engagement with the lower end of its respective supporting sleeve 29. A supporting plate 34 is fixed on each supporting sleeve 29 for supporting a pair of rotary rollers 35 on the opposite sides thereof, the rotary rollers 35 being maintained in rolling engagement with the supporting rails 26. Two supporting sleeves 29 are connected with each other by a U-shaped connecting plate 36 to constitute one unit of the tool module hanging devices 37.

Figure 4:
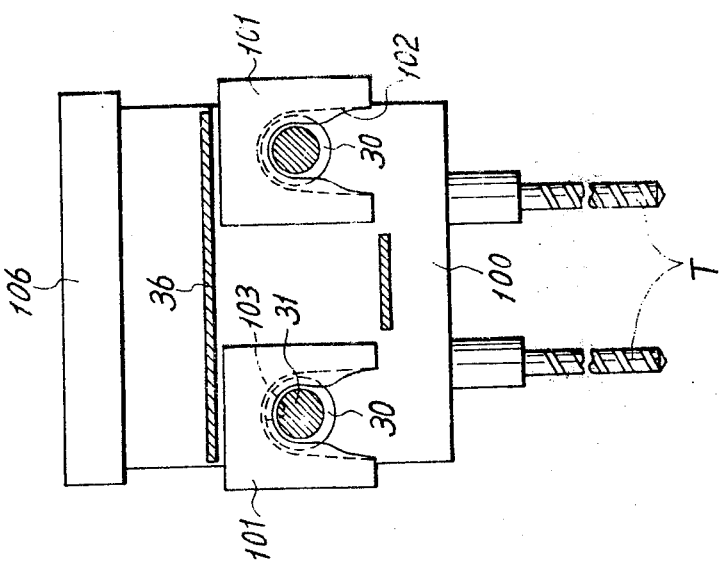
FIG. 4 is an enlarged cross-sectional view, taken along the line IV—IV of FIG. 2.

A pair of L-shaped brackets 101 are securedly mounted on the top of each tool module 100, as shown in FIGS. 3 and 4. Each bracket 101 has a slot portion 102 which is opened toward the front end of tool module 100 so as to receive the enlarged engaging head portion 30 of a supporting rod 31. Furthermore, an engaging slot portion 103 is formed on the inner end of slot portion 102 so as to have an intermediate diameter with respect to the diameters of the enlarged engaging head portion 30 and the supporting rod 31. The engaging slot portion 103 is brought into the hanging position with the enlarged engaging head portion 30 when the tool module 100 is shifted toward the supporting rod 31. Thus, the tool module 100 is hung from the storage magazine 21 in such a state that the tools T thereon are directed outwardly and radially of the circular rails 25 and 26. A pair of push members 38 are rotatably mounted on the magazine body 23 at a tool module changing station C so that one end of each push member 38 may be arranged to be over the upper end of each supporting rod 31 when the tool module hanging device 37 is indexed to the tool module changing station C, as shown in FIG. 3. The other end of the push member 38 is connected to a piston rod 40 of a release cylinder 39 which operates to push down the supporting rod 31 against the force of spring 32 to thereby release the engagement of supporting rod 31 with the tool module 100.

As shown in FIG. 1, an indexing device 41 and a positioning device 42 are mounted on the top of magazine body 23. A driving sprocket wheel 44 is journalled on the indexing device 41 at a position near a tool module loading and unloading station P, described hereinafter, in meshing engagement with the endless chain 27. A driving motor 43 is mounted on the magazine body 23 for driving the endless chain 27 through the driving sprocket wheel 44 so that the tool module 100 may be indexed in a sequential order along the guide rails 25 to the tool module changing station C or the tool module loading and unloading station P. The indexing device 41 is provided with an identifying drum 45 which is connected to the driving sprocket wheel 44 in a predetermined gear ratio. Identifying code members 46 are arranged in a binary form on each column of the periphery of identifying drum 45 for identifying the same. A reading device 47 is mounted on the indexing device 41 for reading the binary code numbers which are designated by the arrangement of identifying code members 46, thus identifying the tool module 100 for indexing the same to the tool module changing station C or the tool module loading and unloading station P.

The positioning device 42 is connected to a sprocket wheel 48 which is journalled at the position near the tool module changing station C in meshing engagement with the endless chain 27. The sprocket wheel 48 is normally free to the rotation of endless chain 27, but it is locked by a knock pin, not shown, which is operated by a positioning cylinder 49 in the completion of the indexing operation. The above-mentioned positioning operation near the tool module changing station C is effective to raise the positioning accuracy of tool module 100, since an indexing error caused by the deflection of endless chain 27 is effectively prevented.

Figure 5:
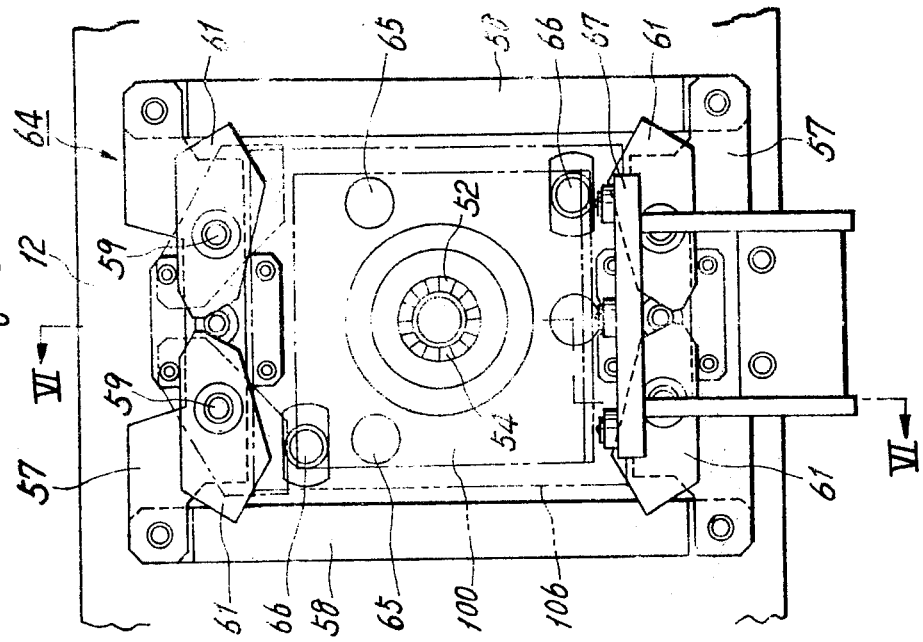
FIG. 5 is an enlarged front view showing the spindle head, taken along the arrow V of FIG. 1.

FIGS. 5, 6 and 7 show the detail of the spindle head 12 on which a main spindle 50 is rotatably mounted in a horizontal direction. Keyed to the spindle 50 is a driving gear 51 which is connected to a driving motor, not shown, through a suitable gearing. A driving sleeve 52 is slidably splined to the front inner portion of main spindle 50, but is restrained against rotation therewith. The driving sleeve 52 is normally urged toward the front end position thereof by a spring 53. Driving teeth 54 are formed on the front end of driving sleeve 52 so as to complementarily engage with driven teeth formed on a driven shaft 104 which is rotatably mounted on the tool module 100.

Two clamping cylinders 55 are mounted on the spindle head 12 above and below the spindle 50 to slidably receive pistons 56 in the axial direction of main spindle 50. Upper and lower horizontal frames 57 are secured to the pistons 56 by means of the piston rods thereof and are connected to each other by vertical frames 58.

Also, four operational shafts 59 are slidably and rotatably carried throughout the upper and the lower horizontal frames 57 in parallel relation with the axis of main spindle 50. A main clamp member 61 and a sub-clamp member 62 are fixedly mounted on the end of each operational shaft 59 on opposite sides of the horizontal frame 57. The main and the sub clamp members 61 and 62 are spaced by a spacer 60 so that a base plate 106 fixed to the tool module 100 may pass therebetween. The forward and backward movement of horizontal frames 57 are transmitted to the operational shafts 59 through the main clamp member 61 and the sub clamp member 62. A gear 63 which is formed on each operational shaft 59 is in meshing engagement with a common rack shaft or a respective rack shaft through a suitable gearing and the rack shaft is connected to a fluid actuator, not shown. Thus, a clamping device 64 is constructed by the above-described clamping cylinder 55, horizontal frames 57, main and sub clamp members 61 and 62, and the like. The clamping device 64 can permit the tool module 100 to pass therethrough in the indexing operation. In the tool module changing operation, however, the clamping device mounts a new tool module 100 on the spindle head 12 and detaches a previously used tool module from the spindle head 12.

A plurality of positioning pads 65 and a plurality of knock pins 66 are fixed on the front of the spindle head 12. On the other hand, a plurality of positioning sleeves 107 are mounted on the base plate 106 so as to receive the knock pins 66 in the positioning operation of tool module 100 with the spindle head 12. The positioning face is formed on the base plate 106 and is brought into abutment engagement with positioning pads 65 in the positioning operation. A tool module supporting member 67 projecting forward is secured to the lower front of spindle head 12 for provisionally supporting the tool module 100 in co-operation with the lower horizontal frame 57 when the tool module 100 is changed between the tool module hanging device and the spindle head 12.

With reference to FIGS. 1, 8, 9 and 10 there will now be described hereunder a tool module loading and unloading device which serves to load and unload the tool module 100 to and from the storage magazine 21. The tool module loading and unloading device is constructed by a loading roller conveyor 68, an unloading roller conveyor 69, a roll-over device 70, an elevator 71, a first transfer cylinder 72 for transferring the tool module 100 between the loading roller conveyer 68 and the roll-over device 70 and a second transfer cylinder 73 for transferring the tool module between the roll-over device 70 and an elevator 71.

The piston rod 74 of the first transfer cylinder 72 secures a hook member 75 which normally projects toward the terminal station of loading roller conveyor 68, as shown in FIG. 8. On the other hand, a block 109 having an engaging concavity is fixed to the tool module 100. A pair of retractable supporting rails 76 are provided in the terminal station are are normally in the retracted position thereof, so that the tool module 100 can be transferred into the terminal station with up-directed tools T and down-directed base plate 106 thereof. It is advantageous for an operator to treat the tool module 100 having such a posture that makes loading and unloading operations thereof easy and safe.

Figure 9:
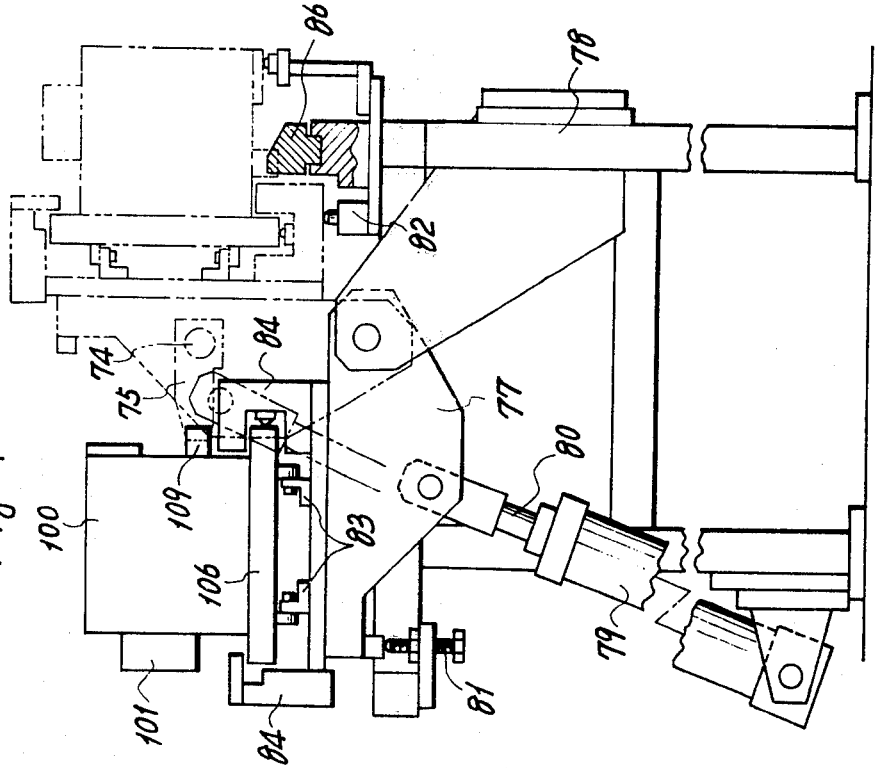
FIG. 9 is a cross-sectional view showing the turn-over device, taken along the line IX—IX of FIG. 8.

In the roll-over device 70, a rotary base 77 is rotatably mounted on a frame base 78 at one end thereof. The rotary base is also rotatably connected to a piston rod 80 of a cylinder 79 which is rotatably connected to the frame base 78 for rotating the rotary base 77. The rotary base 77 is normally in a horizontal state in abutting engagement with a stop member 81, as shown in FIG. 9, but is rotated by 90° by the cylinder 79 to the angular position where guide rails 84, described hereinafter, engage with a stop member 82. A pair of supporting rails 83 are mounted on the rotary base 77 so as to be aligned to the supporting rails 76 on the loading roller conveyor 68 in the horizontal state of rotary base 77. Guide rails 84 are mounted on the opposite sides of supporting rails 83 for receiving and supporting the base plate 106. After the tool module 100 is inserted into the guide rails 84, it is turned by 90° in accordance with the rotary movement of rotary base 77. Thus, the posture of tool module 100 is changed to the posture adequate for the support of the tool module hanging device 37, and the block 109 on tool module 100 is brought into engagement with the hook member 86 which is secured to a piston rod 85 of the second transfer cylinder 73.

In the elevator 71, a pair of pilot bars 87 are vertically mounted on a frame base 88 for slidably mounting a carriage 89 thereon. The carriage 89 is connected to the piston rod 91 of an elevating cylinder 90. Four supporting shafts 93 are slidably and rotatably mounted on the carriage 89 in the horizontal direction perpendicular to the indexing direction of endless chain 27. The front end of each supporting shaft 93 secures a holding block 94 having an engaging concavity to engage with the base plate 109 of tool module 100. These supporting shafts 93 are also rotatably mounted on front and rear connecting plates 92. Shifting cylinders 97 are secured on the rear connecting plate 92 and the piston rods thereof are connected to the rear of the carriage 89. Gears 95 which are formed on the rear ends of supporting shafts 93 are drivingly connected through intermediate gears to a rack shaft 96 which is driven by a fluid actuator, not shown.

Figure 10:
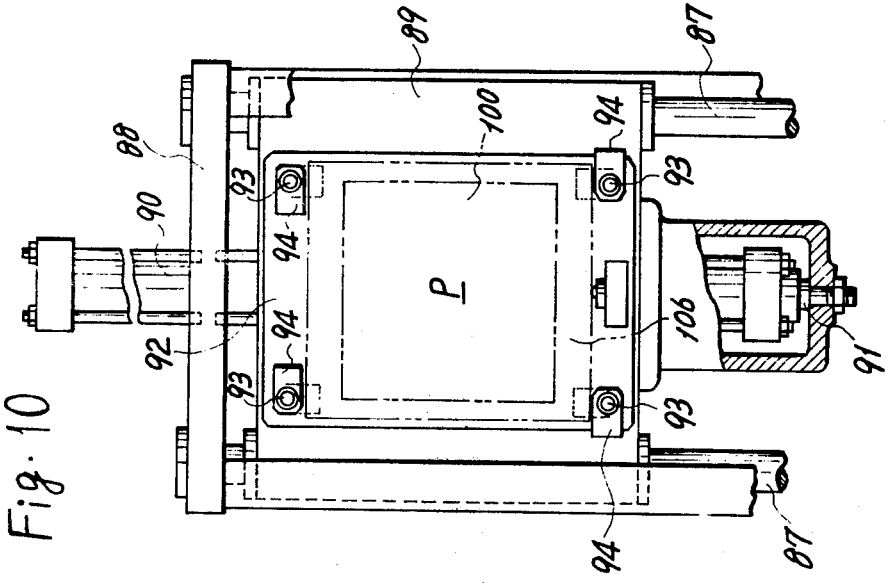
FIG. 10 is a front view, partly broken away, showing the elevator device, taken along the arrow X of FIG. 8.

The carriage 89 is normally held in the upper end position thereof defining the tool module loading and unloading station P where each holding block 94 is normally held in the angular position shown by a real line in FIG. 10. Therefore, the tool module 100 can freely pass through the tool module loading and unloading station P without colliding with holding blocks 94 in the indexing operation. When the previously used tool module 100 is indexed to the loading and unloading station P, the holding blocks 94 are rotated to the angular position, shown by a phantom line in FIG. 10, and brought into a holding engagement with the tool module 100 at the upper and lower portions of tool module 100. The holding blocks 94 are, in turn, shifted toward the carriage 89 by cylinders 97 by a predetermined amount *l* relative to the tool module hanging device 37. Then, the enlarged engaging head portions 30 are brought out of engagement with the slot portion 102. As mentioned above, a shifting device 99 is constructed by holding blocks 94, shifting cylinders 97 and the like and operates for mounting the necessary new tool module on the storage magazine 21 and detaching the unnecessary and previously used tool module from the storage magazine 21.

Although not shown in these Figures, the release cylinders 39 and the push members 38, shown in FIG. 3, are provided at the tool module loading and unloading station P, as well as the tool module changing station C. In the following description of the loading and unloading operation, the construction shown in FIG. 3 is presumed and like reference numerals will be applied hereunder.

Hereunder will be described the tool module clamping operation, assuming that the tool module 100 which is positioned and clamped to the spindle head 12 is performing at a lower machining position a machining operation on a workpiece W positioned and clamped on the rotary table 17. Then, the empty hanging device 37 to hang the tool module 100 has been indexed to the tool module changing station C and the supporting rod 31 has been urged downwardly by the release cylinder 39 against the extensive force of spring 32.

After the completion of the machining operation, the spindle head 12 is moved upwardly by the feed motor 13 for transferring the used tool module 100 from the lower machining position to the tool module changing station C. When the spindle head 12 attains and is positioned at the upper end of the vertical movement thereof, defining the tool module changing station C, the slot 102 of bracket 101 is aligned with the engaging head portion 30 of supporting rod 31. The clamping cylinder 55 is, in turn, operated for moving the horizontal frames 57 away from the front of spindle head 12. The horizontal frames 57 are brought into contacting engagement with main clamp members 61, and in turn the sub clamp members 62 are engaged with the base plate 106. The sub clamp members 62 move the tool module 100 away from the spindle head 12 to thereby unclamp the tool module 100 and at the same time to bring knock pins 66 out of the positioning engagement with positioning sleeves 107 to detach the driven teeth 105 from the driving teeth 54. Thus, the tool module 100 is moved to the position where the bracket 101 is engaged with the engaging head portion 30 and the tool module 100 is provisionally supported by the tool module supporting member 67 and the lower horizontal frame 57. The clamping face of each main clamp member 61 is rotated away from the engaging position with the base plate 106. When the urging force of release cylinder 39 is released, the supporting rod 31 is upwardly moved by the spring 32 to thereby be brought into the hanging engagement with the bracket 101 of tool module 100, which is raised up from the tool module supporting member 67 and the lower horizontal frame 57. Then, the hung tool module 100 is urged by the spring 32 to the connecting plate 36 to thereby be positively fixed to the hanging device 37. Thus, the previously used tool module 100 is again hung by the supporting rod.

After completion of the hanging operation, the numerical control device, not shown, instructs the next tool module to the indexing device 41. The driving motor 43 is controlled in accordance with the instruction to drive and index the next tool module to the tool module changing station C. The base plate 106 of tool module 100 passes through and between the upper and the lower horizontal frames 57 and through and between the main and the sub clamp members 61 and 62. The tool module 100 passing through the changing station C is identified by the reading device 47. The contents identified by the reading device 47 are compared with the contents instructed by the numerical control device. The endless chain 27 is moved and indexed till the desired contents are in accord with each other. When the next tool module 100 is indexed to the tool module changing station C, the indexing movement of endless chain 27 is stopped by the positioning cylinder 49 and simultaneously the driving motor 43 is stopped. Thus, the next tool module 100 is positioned in the tool module changing station C and its base plate 106 is received in the changing device 64.

The positioned tool module 100 is downwardly detached from the hanging device 37 by the operation of the release cylinder 39 and push member 38 to thereby be provisionally mounted on the tool module supporting member 67 and the lower horizontal frame 57. After the engaging head portion 30 is brought out of engagement with the bracket 101, each operational shaft 59 is rotated so that the engaging face of main clamp member 61 may face on the base plate 106. The clamp cylinders 55 are operated to move the horizontal frames 57 toward the front of spindle head 12. The horizontal frames 57 urgingly engage the sub clamp members 62 and in turn the main clamp members 61 are shifted and urged by the clamping cylinders 55 toward the spindle head 12.

The knock pins 66 are brought into positioning engagement with the positioning sleeves 107 and the positioning face of base plate 106 is urgingly engaged with the positioning pads 65. Thus, the tool module 100 is positioned and clamped to the spindle head 12, and at the same time the driven teeth 105 are engaged with the driving teeth 54. The bracket 101 is brought out of engagement with the engaging head portion 30. Thus, the tool module 100 is detached from the hanging device 37. Thereafter, the spindle head 12 is downwardly moved by the feed motor 13 from the changing station C to a lower machining position.

The loading and unloading operation will be described hereunder.

A tool module 100 required to be stored in the storage magazine 21 is first mounted on the loading roller conveyor 68 by an operator in the state that the tools T are upwardly directed and the base plate 106 is downwardly directed. When the particular identifying number of the required tool module 100 is instructed by the numerical control device to the identifying device, the predetermined hanging device 37 to support the tool module 100 is moved to the position at the tool module loading and unloading station P, wherein the enlarged head portion 30 is downwardly moved by the release cylinder 39 and waits for the tool module 100 in the state to receive the same.

The required tool module 100 is moved by the operator to the terminal station of loading roller conveyer 68 where it is engaged with the hook member 75.

When the operator pushes a start button, the supporting rails 76 supporting the tool module 100 are raised from the loading roller conveyer 68. Then, the carriage 68 is downwardly moved by the elevating cylinder 90 engagement with the engaging head portion 30. Thus, the tool module 100 is detached from the hanging device 37. Thereafter, the spindle head 12 is downwardly moved by the feed motor 13 from the changing station C to a lower machining position.

The loading and unloading operation will be described hereunder.

A tool module 100 required to be stored in the storage magazine 21 is first mounted on the loading roller conveyor 68 by an operator in the state that the tools T are upwardly directed and the base plate 106 is downwardly directed. When the particular identifying number of the required tool module 100 is instructed by the numerical control device to the identifying device, the predetermined hanging device 37 to support the tool module 100 is moved to the position at the tool module loading and unloading station P, wherein the enlarged head portion 30 is downwardly moved by the release cylinder 39 and waits for the tool module 100 in the state to receive the same.

The required tool module 100 is movoed by the operator to the terminal station of loading roller conveyor 68 where it is engaged with the hook member 75.

When the operator pushes a start button, the supporting rails 76 supporting the tool module 100 are raised from the loading roller conveyor 68. Then, the carriage 68 is downwardly moved by the elevating cylinder 90 to the lower end of movement thereof. The first transfer cylinder 72 is operated to transfer the tool module 100 to the roll-over device 70 along the rails 76 and 83 which have been aligned with each other by the raising of the supporting rails 76. Thereafter, the hook member 75 is rotated away from the block 109 and in turn the hook member 75 is returned to its initial position.

When the tool module 100 is loaded on the roll-over device 70, the cylinder 79 is operated to rotate the rotary base 77 to the angular position shown by a phantom line in FIG. 9. Thus, the tool module 100 is rolled over through 90° to thereby be changed to the posture adequate for the support by the hanging device 37. The block 109 of tool module 100 is brought by the roll-over operation into engagement with the hook member 86 of second transfer cylinder 73. The second transfer cylinder 73 is operated to transfer the tool module 100 from the roll-over device 70 to the elevator 71 wherein the carriage 89 has been waiting for the tool module 100 at the fall end thereof.

The base plate 106 of tool module 100 is inserted into the holding block 94, and thereafter, the elevating cylinder 90 is operated to lift the carriage 89 to transfer the tool module 100 to the tool module loading and unloading station P. When the carriage 89 attains the upper raised position thereof, the engaging slot 102 of tool module 100 is aligned with the engaging head portion 30 of supporting rod 31. While the carriage 89 is rising, the hook member 86 is returned to its initial position. The shifting cylinders 97 are operated to forwardly move the supporting shafts 93 so that tool module 100 may be shifted to the position where the bracket 101 of tool module 100 is engaged with the engaging head portion 30. The release cylinder 39 is, in turn, operated to release the urging force which has been exerted by the push member 38. The supporting rod 31 is upwardly moved by the spring 32 so as to be engaged with the bracket 101 to thereby support the tool module 100 thereon. Thereafter, the supporting shafts 93 are rotated to detach the holding blocks 94 from the base plate 106. Thus, the tool module 100 is loaded on the hanging device 37 and is stored in the storage magazine 21.

Although the unloading operation to transfer the tool module 100 from the storage magazine 21 to the unloading roller conveyer 69 is not described, the tool module is transferred by the first transfer cylinder 72 to the terminal station of loading roller conveyer 68 in the operation cycle approximately in reverse fashion to the afore-mentioned loading operation, and is changed by the operator from the terminal station to the unloading roller conveyer 69. The tool module 100 is unloaded from the unloading roller conveyer 69 in the same posture that it is loaded into the loading roller conveyer 68.

Although certain specific embodiments of the invention have been shown and described, it is obvious that many modifications and variations thereof are possible in light of the above teachings. It is to be understood therefore, that within the scope of the appended claims, the invention may be practiced otherwise than as specifically described herein.

We claim:

1. A machine tool comprising:
   a machine column;
   a plurality of supporting members;
   an overhead magazine body mounted on said supporting members, said overhead magazine body having a circular guide way wherein a first changing station and a second changing station are provided;
   a plurality of holding means indexably mounted on said circular guide way for detachably holding a plurality of tool modules, respectively, said tool modules being changed at said first changing station and said second changing station;
   a spindle head slidably mounted on said machine column so as to be moved from a lower machining position to an upper end of vertical movement thereof defining said first changing station;
   means for moving said holding means along said circular guide way to index the same to said first changing station and said second changing station;
   clamping means mounted on said spindle head for shifting the tool module between said holding means and said spindle head in a direction traversing said circular guide way to thereby clamp the same on said spindle head, said clamping means permitting said tool modules to pass therethrough in the indexing operation;
   a frame base;
   an elevator means slidably mounted on said frame base for moving the tool module toward and away from said second changing station defined by the upper end of movement thereof; and,
   shifting means mounted on said elevator means for shifting the tool module in the traverse direction to replace the same between said holding means and said elevator means, said shifting means permitting said holding means to pass therethrough in the indexing operation.

2. A machine tool according to claim 1, wherein each of said tool modules comprises:
a module body for rotatably supporting at least one tool on the front thereof;
a base plate fixed on the rear of said module body for providing positioning means; and,
a pair of brackets fixed to the top of said module body.

3. A machine tool according to claim 2, wherein each of said holding means comprises:
a pair of bodies;
roller means rotatably mounted on said pair of bodies for movably supporting the same on said guide way;
a pair of supporting rods vertically movable on said bodies, each of said pair of supporting rods having an engaging head portion on the lower end thereof to engage with each of said pair of brackets;
a connecting plate for connecting said pair of bodies; and
spring means mounted between said bodies and said supporting rods for normally urging the tool module to said connecting plate to thereby hold the same by said holding means.

4. A machine tool according to claim 3, wherein each body is connected to each other by link means to thereby form an endless chain.

5. A machine tool according to claim 3, further comprising:
actuator means mounted on said overhead magazine body at said first changing station and said second changing station for engaging and disengaging the tool module with said holding means.

6. A machine tool according to claim 5, wherein each of said actuator means comprises:
a push member rotatably mounted on said overhead magazine body, the upper end of each supporting rod being aligned with one end of said push member when the holding means is indexed to said first changing station and said second changing station; and an actuator connected to the other end of said push member for downwardly pushing said supporting rod against the force of said spring means to thereby disengage the same with said tool module.

7. A machine tool according to claim 2, said clamping means comprising;
operational shafts rotatably and slidably mounted on said spindle head;
a pair of clamp members secured to each of said operational shafts and spaced so as to permit said base plate to pass therebetween in the indexing operation;
frame members mounted on said operational shafts and between said pair of clamp members; and
actuator means connected to said frame member for clamping the tool module on said spindle head through said pair of clamp members.

8. A machine tool according to claim 7, wherein said spindle head has positioning means on the front thereof for positioning the module to said spindle head in cooperation with said positioning means of said tool module.

9. A machine tool according to claim 1, wherein said shifting means comprises:
supporting shafts slidably mounted on said elevator means in the horizontal direction traversing said guide way,
holding member means connected to said supporting shafts for holding the tool module; and
actuator means mounted between said elevator means and said supporting shafts for shifting said holding member means in the horizontal direction to thereby engage and disengage the tool module with said elevator means.

10. A machine tool according to claim 9, further comprising:
conveyor means for conveying the tool module;
roll-over means for turning the tool module to align the tool module to said holding member means;
a first cylinder means for transferring the tool module between said conveyor means and said roll-over means; and
a second cylinder means for transferring tool module between said roll-over means and said holding means.

* * * * *